United States Patent
Jau et al.

(10) Patent No.: US 6,205,505 B1
(45) Date of Patent: Mar. 20, 2001

(54) METHOD FOR REDUCING ELECTROMAGNETIC INTERFERENCE (EMI) IN A UNIVERSAL SERIAL BUS TRANSMISSION SYSTEM

(75) Inventors: Dean Jau, Miao-Li Hsien; Jeff Hsin; Edward Tsai, both of Taipei; Chiao-Yen Tai, Hsinchu, all of (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 09/237,184

(22) Filed: Jan. 25, 1999

(30) Foreign Application Priority Data

Oct. 14, 1998 (TW) ................................. 87117031

(51) Int. Cl.[7] ........................................ G06F 13/00
(52) U.S. Cl. .......................... 710/126; 710/100; 710/129
(58) Field of Search ..................... 710/100, 101, 710/126, 129, 63; 713/300, 322; 375/346; 331/48, 49, 51, 53

(56) References Cited

U.S. PATENT DOCUMENTS

| | | | |
|---|---|---|---|
| 6,000,042 | * 12/1999 | Henrie | 714/40 |
| 6,049,880 | * 4/2000 | Song | 713/300 |
| 6,067,628 | * 5/2000 | Krithivas et al. | 713/340 |
| 6,101,076 | * 8/2000 | Tsai et al. | 361/90 |

* cited by examiner

*Primary Examiner*—Ario Etienne

(57) ABSTRACT

A universal serial bus (USB) transmission system for transmitting a monitor control signal and a data signal from a monitor system to a main frame is provided. The universal serial bus transmission system separately includes a universal serial bus interface IC and a monitor controller IC between which the monitor control signal and the data signal are transmitted through a low-speed transmission interface, thereby reducing costs for handling electromagnetic interference (EMI). Furthermore, the universal serial bus interface can be modularized to allow the monitor system to serve as a general monitor system or a USB monitor system, thereby increasing the utility of the monitor system.

12 Claims, 2 Drawing Sheets

METHOD FOR REDUCING ELECTROMAGNETIC INTERFERENCE (EMI) IN A UNIVERSAL SERIAL BUS TRANSMISSION SYSTEM

CROSS-REFERENCE TO RELATED APPLICATION

This application claims the priority benefit of Taiwan application serial no. 87117031, filed Oct. 14, 1998, the full disclosure of which is incorporated herein by reference.

BACKGROUND OF THE INVENTION

1. Field of the Invention

The invention relates to a universal serial bus (USB) transmission system, and in particular to a universal serial bus transmission system which can prevent high-speed transmission signals from electromagnetic interference (EMI) by using a low-speed transmission interface to transmit a control signal and a data signal, thereby reducing costs for handling electromagnetic interference.

2. Description of the Related Art

Since IBM company developed personal computers (PCs), PC XT and PC AT, IBM PCs and compatibles have been widely used in the whole world. During this period the functions of PCs are greatly enhanced, and more peripherals, such as GUI operating systems and mouse, are provided in line with continuous progress in the semiconductor technology. To print required data out, printers seem to become a necessary peripheral. Moreover. moderns are widely used by users to connect popular internet. To avoid a large amount of data from losing, resulting from breakdown of computers back-up devices with a large amount of storage capacity are prepared for regular data back-up. Scanners are also a widely-used peripheral for scanning graphics.

So far, all peripherals stated above have been widely, even necessarily, used. However, each peripheral has been developed with a different purpose in a different circumstance. Therefore, a different interface is designed for each peripheral. For example, a RS232 serial interface is used for mouse, and a parallel interface is used for printer. Additionally, some interfaces need to install additional interface cards. For example, a small computer system interface (SCSI) used to connect back-up devices with a large amount of storage capacity needs an additional interface card installed. Particularly, some peripherals use their own specific interfaces. For example, a number of scanners use a special interface which needs a specific interface card installed. Thus, a personal computer must provide a number of slots for installing various interface cards. If a personal computer simultaneously uses all the peripherals described above, relatively more connective lines used to electrically connect the personal computer and the peripherals are needed, resulting in a mess.

To overcome the above-stated disadvantages, a specification of USB interface has been developed, and allows all peripherals to use the standard interface for connection. As a result, the installation for a personal computer system is greatly simplified, and it is unnecessary to leave an excessive space for installing special interface cards. In addition, the USB interface has a PnP function. That is, a personal computer can automatically detect all connected peripherals, and install related drivers for users. For a further clear description, the USB interface has a play-and-plug function, and can connect installed peripherals during the operation of a personal computer. After that, the personal computer can automatically detect all the connected peripherals, and install related programs without shutting down and then rebooting the personal computer. Thus, users can freely use all the connected peripherals. Similarly, when the peripherals are disconnected, the personal computer can automatically detect this status, then removes corresponding programs, thereby avoiding the users from using the corresponding programs to cause operational errors.

Even though the USB interface has a number of advantages mentioned above the USB interface are easily interfered by high-voltage regions or generates electromagnetic fields to interferes other surrounding devices, resulting from the high transmission rate thereof. As an example, in a simple USB monitor system, the USB interface is integrated in a monitor controller IC.

FIG. 1 is a schematic view showing a conventional USB transmission system 10. In FIG. 1, a monitor controller IC 12 is disposed on the front end of a monitor system 10. The monitor controller IC 12 is electrically connected to a plug 14 through a cable 16. The cable 16 passes through a number of high-voltage regions 18. Currently, the USB interface has a high transmission rate of approximately 1.5M or 12M bits/sec. During the transmission, the USB interface is easily interfered by the high-voltage regions 18, and even interferes other surrounding devices.

Referring to FIG. 1, an electromagnetic protective region 19 is formed surrounding the cable 16, thereby preventing signals transmitted through the cable 16 from being interfered by electromagnetic fields. However, This increases costs for handling electromagnetic interference (EMI) of the monitor system.

SUMMARY OF THE INVENTION

In view of the above an object of the invention is to provide a universal serial bus (USB) transmission system including separate universal serial bus interface and monitor controller ICs between which a monitor control signal and a data signal from a monitor system are transmitted through a low-speed transmission interface, thereby reducing costs for handling electromagnetic interference (EMI). Furthermore, the universal serial bus interface can be modularized to allow the monitor system to serve as a general monitor system or a USB monitor system, thereby increasing the utility of the monitor system.

To achieve the above-stated object, a universal serial bus (USB) transmission system for transmitting a monitor control signal and a data signal from a monitor system to a main frame includes a monitor controller IC, a low-speed transmission interface and a universal serial bus interface IC. The monitor controller IC is disposed on the front end of the monitor system. The low-speed transmission interface passes through at least one high-voltage region of the monitor system, and is used to transmit the monitor control signal and the data signal output from the monitor controller IC. The universal serial bus interface IC is used to receive the monitor signal and the data signal, and then transmit the monitor signal and the data signal to the main frame.

Furthermore, another universal serial bus (USB) transmission system for transmitting a monitor control signal and a data signal from a monitor system to a main frame includes a monitor interface connector and a universal serial bus module. The monitor interface connector is disposed on the back end of the monitor for outputting the monitor control signal and the data signal. The universal serial bus module is electrically connected to the monitor interface connector, and is used to receive the monitor control signal and the data signal, and then transmit the monitor control signal and the data signal to the main frame.

BRIEF DESCRIPTION OF THE DRAWINGS

The invention will become more fully understood from the detailed description given hereinbelow and the accompanying drawings which are given by way of illustration only, and thus do not limit the present invention, and wherein.

DETAILED DESCRIPTION OF THE PREFERRED EMBODIMENTS

Figure 1:
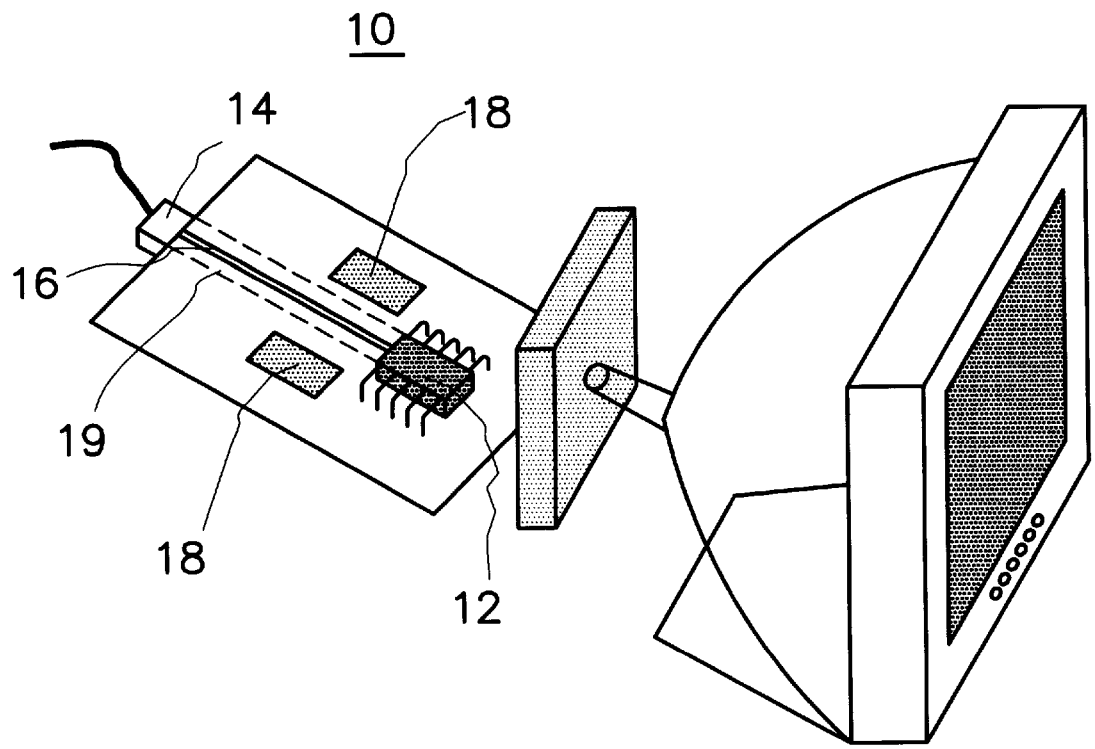
FIG. 1 is a schematic view showing a conventional USB transmission system.
Figure 2:
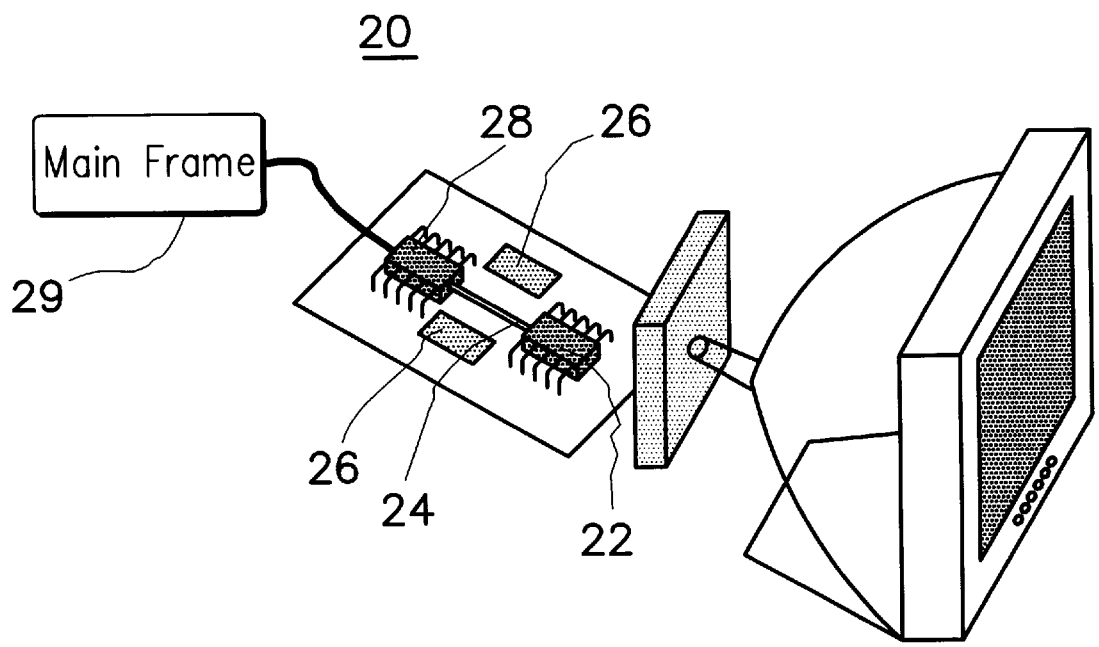
FIG. 2 is a schematic view showing a USB transmission system according to a first preferred embodiment of the invention.

FIG. 2 is a schematic view showing a USB transmission system 20 according to a first preferred embodiment of the invention. As shown in FIG. 2, a monitor controller IC 22 is disposed on the front end thereof. Moreover, a low-speed transmission line 24 passes through at least one high-voltage region 16, and is used to transmit a monitor control signal and a data signal output from the monitor controller IC 22 to a universal serial bus interface IC 28. The universal serial bus interface IC 28 is used to receive the monitor signal and the data signal and then transmit the monitor signal and the data signal to a main frame 29 at a transmission rate of approximately 1.5M or 12M bits/sec.

Figure 3:
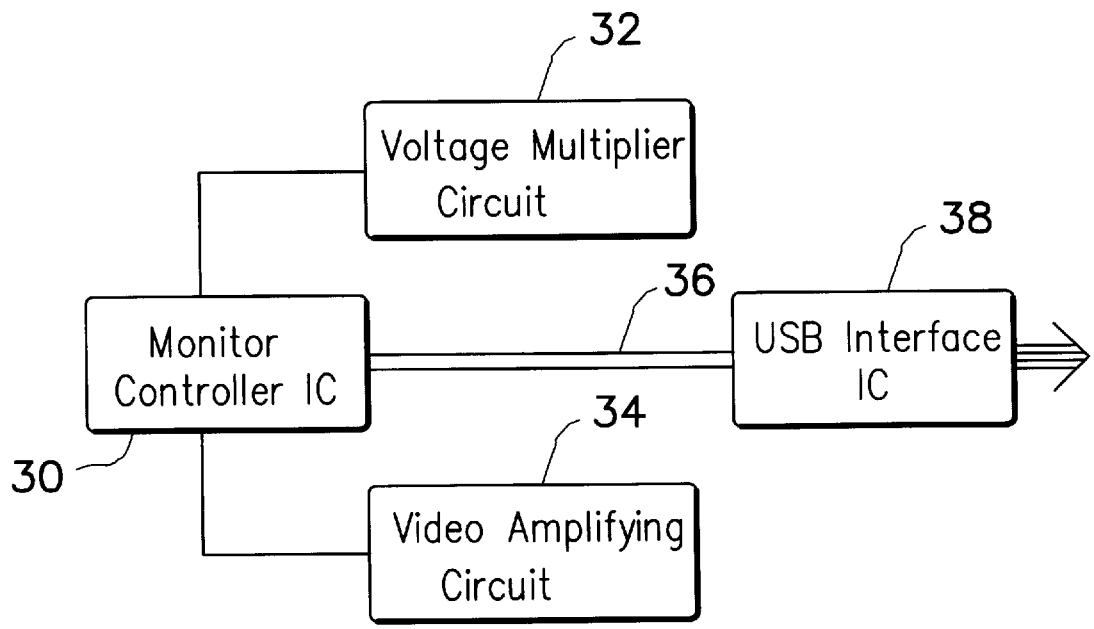
FIG. 3 is a block diagram of the USB transmission system of FIG. 2.

FIG. 3 is a block diagram of the USB transmission system 20 of FIG. 2. In FIG. 3, a monitor controller IC 30 is used to control a voltage multiplier circuit 32 which provides vertical and horizontal scans, and acts as a high-voltage region. Additionally, a video amplifying circuit 34 used for displaying also acts a high-voltage region. The monitor controller IC 30 transmits a monitor control signal and a data signal to a universal serial bus interface IC 38 through a low-speed transmission interface 36, such as a conventional I2C interface, an SPI interface, a UART interface and a RS232 interface. The low-spaced transmission interface 36 passes through the two high-voltage regions. Then, the monitor control signal and the data signal are output from the universal serial bus interface IC 38. Since the low-speed transmission interface 36 has a transmission rate of about several tens of K bits/sec (less than 400K bits/sec), electromagnetic interference caused by the two high-voltage regions and interference to other surrounding devices can be efficiently prevented.

Figure 4:
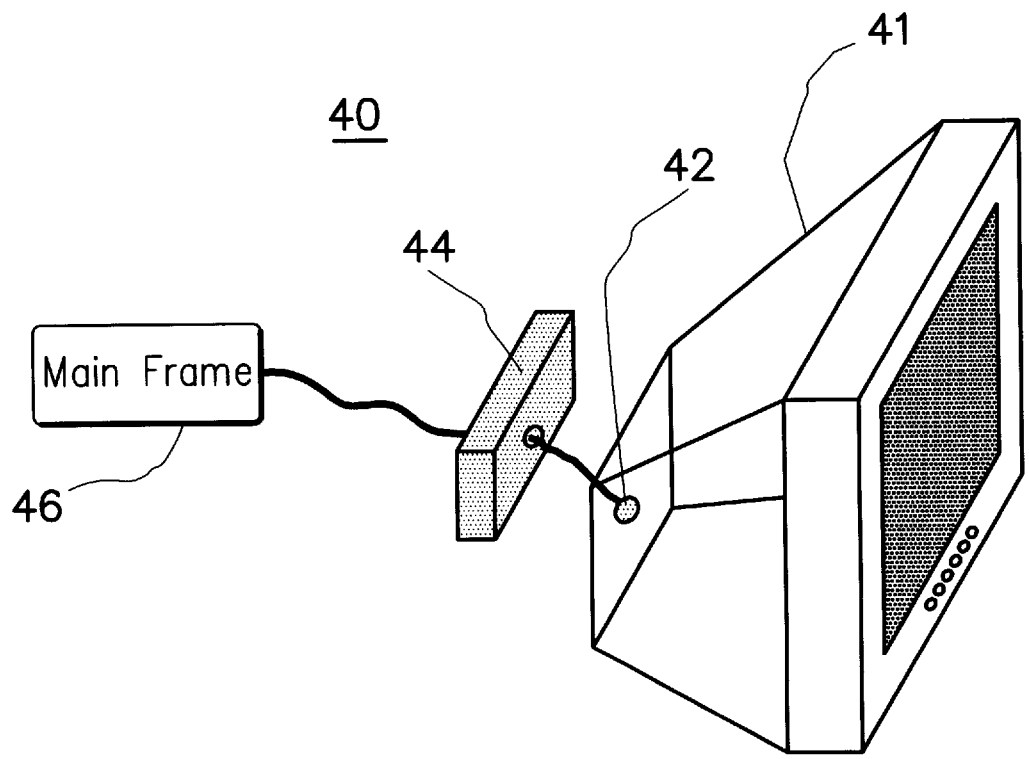
FIG. 4 is a schematic view showing a USB transmission system according to a second preferred embodiment of the invention.

FIG. 4 is a schematic view showing another USB transmission system 40 according to a second preferred embodiment of the invention. As shown in FIG. 4, a monitor interface connector 42 disposed on the back end of a monitor 41 is electrically connected to a USB module 44, wherein the monitor interface connector 42 is a low-speed transmission connector, such as an I²C connector. The USB module 44 is used to receive a monitor control signal and a data signal, and then transmit the monitor control signal and the data signal to a main frame 46. Due to the use of the USB module 44, costs for manufacturing the monitor is greatly reduced, and the utility of the monitor is flexibly increased.

Accordingly, a first feature of the invention is that a USB monitor system includes two separately chips. One is a monitor controller; the other is a USB interface. Moreover a low-speed transmission interface is used for transmission, thereby reducing costs for handling electromagnetic interference.

A second feature of the invention is that the USB interface is modularized to allow the monitor system to act as a general monitor system or a USB monitor system, depending on whether the USB module is used, thereby increasing the utility of the monitor system.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A universal serial bus (USB) transmission system for transmitting a monitor control signal and a data signal from a monitor system to a main frame, the universal serial bus transmission system comprising:
   a monitor controller IC disposed on the front end of the monitor system;
   a low-speed transmission interface passing through at least one high-voltage region of the monitor system for transmitting the monitor control signal and the data signal output from the monitor controller IC;
   a universal serial bus interface IC for receiving the monitor signal and the data signal, and then transmitting the monitor signal and the data signal to the main frame.

2. The universal serial bus transmission system as recited in claimed 1, wherein the low-speed transmission interface is an I²C interface.

3. The universal serial bus transmission system as recited in claimed 1, wherein the low-speed transmission interface is an SPI interface.

4. The universal serial bus transmission system as recited in claimed 1, wherein the low-speed transmission interface is a UART interface.

5. The universal serial bus transmission system as recited in claimed 1, wherein the low-speed transmission interface is a RS232 interface.

6. The universal serial bus transmission system as recited in claimed 1, wherein the transmission rate of the low-speed transmission interface is less than 400K bits/sec.

7. The universal serial bus transmission system as recited in claimed 1, wherein the transmission rate of the universal serial bus interface IC is approximately 1.5M bits/sec.

8. The universal serial bus transmission system as recited in claimed 1, wherein the transmission rate of the universal serial bus interface IC is approximately 12M bits/sec.

9. A universal serial bus transmission system for transmitting a monitor control signal and a data signal from a monitor to a main frame, the universal serial bus transmission system comprising:
   a monitor interface connector disposed on a back end of the monitor for outputting the monitor control signal and the data signal; and
   a universal serial bus module electrically connected to the monitor interface connector for receiving the monitor control signal and the data signal, and then transmitting the monitor control signal and the data signal to the main frame.

10. The universal serial bus transmission system as claimed in claim 9, wherein the monitor interface connector is a low-speed transmission connector.

11. The universal serial bus transmission system as claimed in claim 9, wherein the monitor interface connector is an I$^2$C connector.

12. A method for reducing electromagnetic interference (EMI) in a universal serial bus transmission system comprising:

providing a monitor controller IC on the front end of a monitor system;

providing a universal serial bus interface IC for receiving and transmitting a monitor signal and a data signal; and providing a low-speed transmission interface for transmitting a monitor control signal and a data signal between the monitor controller IC and the universal serial bus interface IC, wherein the monitor control signal and the data signal pass through at least one high-voltage region of the monitor system.

* * * * *